May 14, 1963 L. M. HENDON Re. 25,387

FISHING ROD HOLDER

Original Filed May 8, 1961

INVENTOR.
LOFTON M HENDON
BY Chas. Denegre
ATTORNEY

United States Patent Office

Re. 25,387
Reissued May 14, 1963

25,387

FISHING ROD HOLDER

Lofton M. Hendon, 616 Houston St., Birmingham, Ala.

Original No. 3,036,800, dated May 29, 1962, Ser. No. 108,661, May 8, 1961. Application for reissue Nov. 6, 1962, Ser. No. 236,189

4 Claims. (Cl. 248—41)

Matter enclosed in heavy brackets [ ] appears in the original patent but forms no part of this reissue specification; matter printed in italics indicates the additions made by reissue.

This invention relates to a fishing rod holder. It has for its main objects to provide such a holder that will be highly satisfactory for the purpose intended, comparatively cheap to manufacture, simple in structure, easy to use and keep in serviceable condition, and extremely durable. The holder is especially intended for deep sea fishing but is also suitable for any kind of fishing with a fishing rod having a reel thereon.

It is well known by fishermen that it is troublesome to hold the handle of a rod with one hand with a reel mounted thereon and keep the reel in straight upright position, and turn the crank of the reel with the other hand, when a large fish is on the hook of the line. The present holder provides easy means for the fisherman to hold the rod in place for use by keeping the rod in the supporting means for eliminating such trouble.

Other objects and advantages will appear from the drawing and specification.

By referring generally to the drawing it will be observed that,

Similar reference numerals refer to similar parts throughout the several views.

Figure 1:
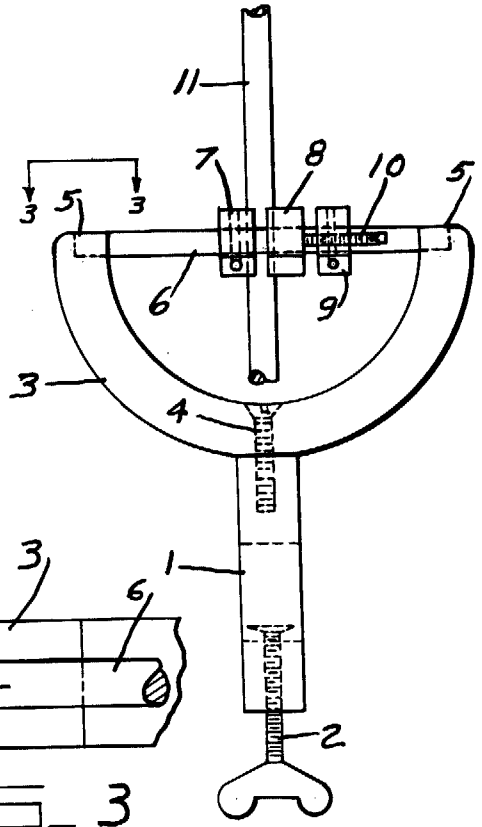
FIG. 1 is a front elevational view of a fishing rod holder made according to this invention.
Figure 2:
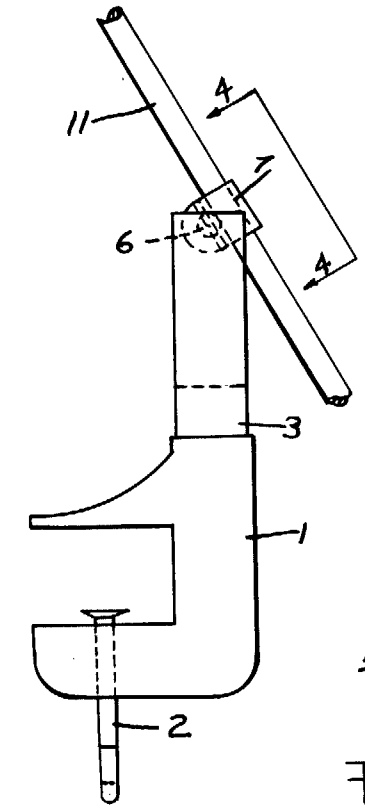
FIG. 2 is a side elevational view of FIG. 1.
Figure 3:
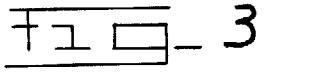
FIG. 3 is an enlarged detail view on line 3—3 of FIG. 1.
Figure 4:
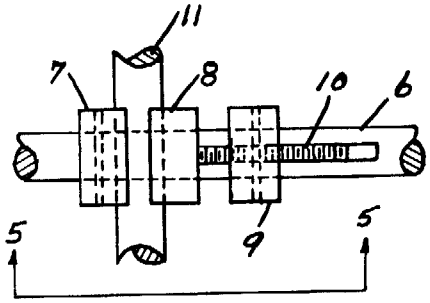
FIG. 4 is an enlarged detail view on line 4—4 of FIG. 2 showing the clamping means for holding a rod in the desired position.
Figure 5:
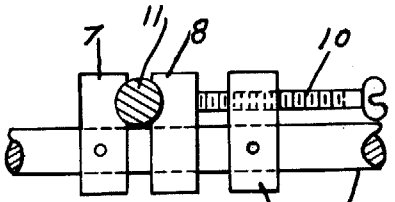
FIG. 5 is a view on line 5—5 of FIG. 4.

Referring to the drawing in detail it will be seen that the holder comprises a clamp 1 with adjusting wing bolt 2 as means for removable attachment on the rail of a fishing boat or the like. The circular part 3 is attached revolvably by screw means 4 on the clamping part. In each end of the circular part a groove 5 is provided for a round bar 6 to be supported removably therein. An approximately square part 7 is attached on the bar. A similar square part 8 is mounted slidably on the bar. Another square part 9 is attached on the bar and is provided with a wing bolt 10 for the purpose of clamping the fishing rod 11 between the fixed and slidable block. The faces of the blocks that contact the rod are shown rounded to fit adjacent the rod but they could be made flat if desired.

From the foregoing it will appear that one part of the clamping means of the holder on the round bar is attached to the round bar and the other clamping part is slidable and adjustable by manual means applied to bolt in the second attached part on the bar.

The parts of the holder may be made of any material suitable for the purpose, but I prefer to use rust proof material such as aluminum or the like. Also the holder may be made in different sizes and capacities depending on how and where to be used.

While I have shown and described the preferred embodiment of my invention, I do not wish to limit same to the exact and precise details of structure, and I reserve the right to make all modifications and changes so long as they remain within the scope of the invention and the following claim.

Having described my invention I claim:

*1.* A fishing rod holder comprising, a lower part having a slot formed therein, an adjusting wing type bolt, said bolt being mounted in the lower part, a supporting part, this part being half circular in shape and being mounted revolvably on the lower part, said half circular part having a groove formed in each of its ends, a round bar, said bar fitting removably with its ends in the said grooves; an approximately square part, this part attached on the said round bar, a curved recess formed in one face of this part; a second approximately square part, this part being mounted slidable on the round bar, this square part having a curved recess in its face opposite the recess in the other square part; a third approximately square part, this part being attached on the round bar, a wing type bolt, this bolt being inserted through a threaded hole through the third square block.

*2. A fishing rod holder comprising:*

*(a) a clamping member adapted for removable attachment to a support,*

*(b) a first support member mounted for horizontal pivotal movement on said clamping member and having laterally spaced, upwardly opening recesses therein,*

*(c) a second support member extending transversely between said upwardly opening recesses and having laterally spaced bearing members fitting removably and revolvably in said upwardly opening recesses and adapted for free separation therefrom by upward movement of said second support member relative to said upwardly opening recesses,*

*(d) clamping jaws carried by said second support member intermediate said bearing members disposed to engage a fishing rod and hold said rod substantially normal to a common plane passing through said bearing members while said bearing members are within said upwardly opening recesses whereby said fishing rod is adapted for free pivotal movement in both vertical and horizontal planes, and*

*(e) means to hold said clamping jaws at selected positions relative to each other whereby the fishing rod is clamped therebetween.*

*3. A fishing rod holder comprising:*

*(a) a clamping member adapted for removable attachment to a support,*

*(b) a first support member mounted for horizontal pivotal movement on said clamping member and having laterally spaced upwardly opening recesses therein,*

*(c) a second support member having laterally spaced bearing members fitting removably and revolvably in said upwardly opening recesses,*

*(d) a pair of clamping jaws carried by said second support member intermediate said bearing members disposed to engage a fishing rod and hold said rod substantially normal to a common plane passing through said bearing members while said bearing members*

*are within said upwardly opening recesses whereby said fishing rod is adapted for free pivotal movement in both vertical and horizontal planes,*

*(e) one of said clamping jaws being stationary and the other clamping jaw being movable relative to said second support member, and*

*(f) means to hold said other clamping jaw at selected positions relative to the first mentioned clamping jaw whereby the fishing rod is clamped therebetween.*

*4. A fishing rod holder as defined in claim 3 in which the means to hold said other clamping jaw at selected positions comprises a threaded member carried by said second support member and disposed to engage and move said other jaw to selected positions.*

References Cited in the file of this patent or the original patent

UNITED STATES PATENTS

| | | |
|---|---|---|
| 462,319 | Loehner | Nov. 3, 1891 |
| 1,963,463 | Hammer | June 19, 1934 |
| 2,769,607 | Thompson | Nov. 6, 1956 |
| 2,961,209 | Willey | Nov. 22, 1960 |